Dec. 30, 1969    E. R. THORN ETAL    3,487,017
WASTE WATER TREATMENT METHOD AND APPARATUS
Filed May 12, 1967    4 Sheets-Sheet 1

INVENTOR.
EWALD REINHARD THORN
RUDOLF CHRISTIAN PASSAVANT
BY John L. Munday
Agent

INVENTOR,
EWALD REINHARD THORN
RUDOLF CHRISTIAN PASSAVANT
BY

United States Patent Office 3,487,017
Patented Dec. 30, 1969

3,487,017
WASTE WATER TREATMENT METHOD
AND APPARATUS
Ewald Reinhard Thorn, Ruckershausen, and Rudolf Christian Passavant, Michelbacher Hutte, Germany, assignors to Passavant-Werke, Michelbacherhutte, near Michelbach, Nassau, Germany, a corporation of Germany
Filed May 12, 1967, Ser. No. 638,113
Int. Cl. B01d 21/01
U.S. Cl. 210—46
16 Claims

ABSTRACT OF THE DISCLOSURE

A flocculation and sedimentation method and apparatus for clarifying waste water wherein incoming liquid is gently mixed in a chamber and is then divided and passed into two portions in separate flocculation chambers to induce flocculation therein. Substantially all of the first portion is returned to the mixing chamber while the second portion is subdivided with part being re-cycled to the mixing chamber and the other part removed for settlement thereby providing maximum pollutant contact to enhance the flocculation process.

Background of the invention

Figure 1:
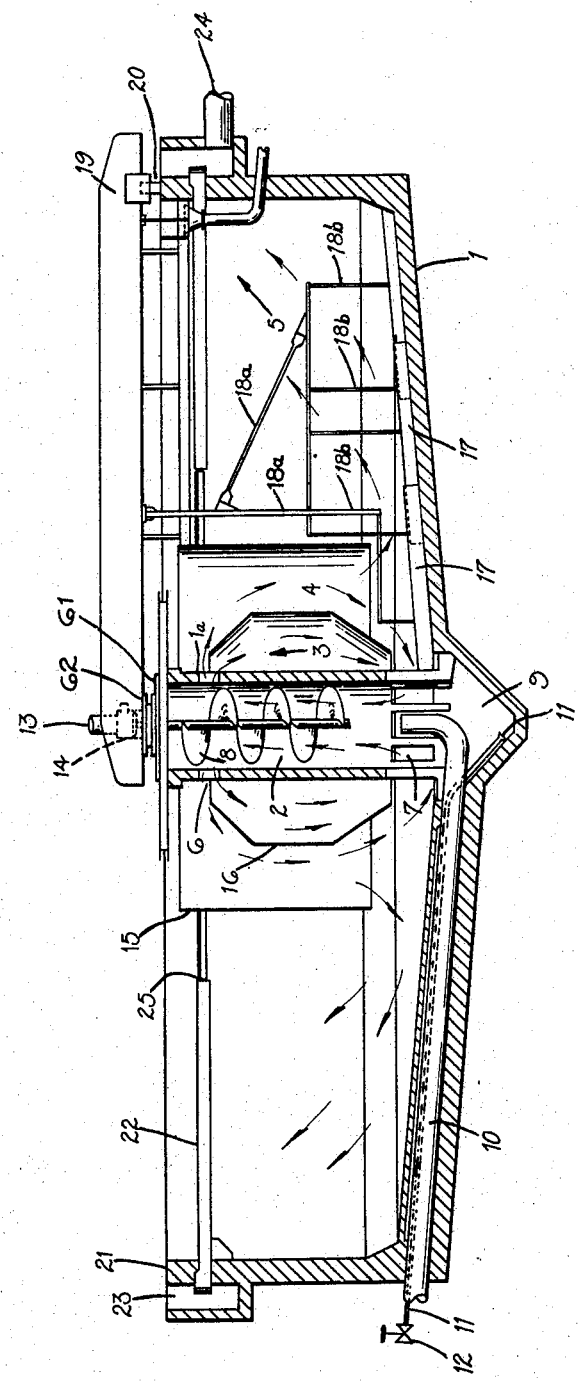

The present invention relates to a waste water treatment plant, and, more particularly to a flocculation and settling tank wherein finely distributed mineral and organic solids are concentrated by flocculation in mixing and reaction chambers within the sedimentation tank prior to the distribution of the flocculated accumulations into the tank for settlement.

Prior flocculation apparatus of a mechanical nature commonly performed the flocculation process by agitating the liquid with paddles or blades so as to create a condition of constant particle contact conducive to the conglomeration and collection of suspended particles into flocs of a size and density that would readily settle. Sometimes, the floccuation apparatus was located within a sedimentation tank so that accumulations discharged from the flocculation apparatus could immediately settle to the floor of the tank to be scraped away. The raw waste water or sewage influent was introduced into the center of the flocculation apparatus where it was directed radially outwardly by and through several concentrically arranged sets of paddles which rotated about a vertical axis intermeshing with a corresponding set of stationary blades to maintain an agitated condition.

This type of flocculation device was cumbersome, complicated and inefficient, however, and separate tanks were sometimes used for the flocculation and sedimentation operations because the flocculation apparatus itself, with its paddles and blades, required so much space.

Historically, the problem has been how to treat all the incoming liquid which contains both suspended particles and more readily sinkable solids. To encourage flocculation of the suspended particles, a controlled, slightly agitated condition is required. On the other hand, a relatively calm, pool-like condition is most conducive for sedimentation. The attempted solution of providing both of these conditions in one piece of equipment to treat the floccible and non-floccible portions of liquid has been the subject of many patents.

Devices, such as the paddle equipped flocculation tanks described above, attempt to provide both conditions by introducing raw influent into the center of an annular flocculation zone which communicates with a sedimentation tank through its bottom or far sidewall or both. The rotating paddles, often cooperating with stationary blades serve as mechanical means to provide intimate contact between particles. Chemicals are often added to the flocculation zone to induce flocculation or amassement of minute particles and the mixing action of the paddles is used as an aid in circulating the chemicals.

A troublesome characteristic of such prior devices is that the larger grit particles in floc accumulations tend to destroy other, partly formed, flocculations. Destruction occurs as a result of the interaction and collision in the flocculation zone between the large and small floc accumulations and the larger, sometimes gritty solids which travel through the flocculation zone, under the impetus of the influent pressure and paddle agitation, before settling to the bottom of the sedimentation tank. Such interaction is encouraged in order to build small flocculation accumulations into larger ones; the theory is that when accumulations reach the proper size, they will be too heavy to rise or remains suspended under the influence of paddles and will settle to the bottom to be scrapped away.

However, this method has not achieved notable success because no attempt has been made to distinguish between the larger and smaller flocculations other than to presume that larger, heavier accumulations will settle to the bottom despite agitation of the paddles. Accordingly, large flocculations that would otherwise settle are sometimes broken up, under the agitation of the paddles, into smaller flocculations which are less likely to settle. Also, smaller flocculations that might still be heavy enough to settle are kept suspended by the agitation and are consigned to remain in the flocculation chamber which increases their chances of being broken up into less dense, non-sinkable accumulations. It is not difficult to see, therefore, that a paradoxical situation can exist wherein the paddles, which are designed to encourage the initial particle contact in flocculation, also subsequently serve to destroy already formed flocculation accumulations. This reduces the efficiency of the process and apparatus considerably.

Summary of the invention

The problems associated with the efficient flocculation of mineral and/or organic solids and other pollutants in sewage are obviated with this invention. Since flocculation into the desired large clumps is primarily a function of time, the flocculation zone in this apparatus is divided into at least two concentric reaction chambers annularly arranged about the central mixing chamber contained in the sewage inlet tower. The top and bottom portions of the concentric reaction chambers are open to allow fluid communication and recirculation between each reaction, or flocculation, chamber and the mixing chamber in the inlet tower. Mixed and partially flocculated waste water from the mixing chamber is discharged from the top of the inlet tower and apportioned among the flocculation chambers by adjustable end sections on the top and bottom of each flocculation chamber wall. Substantially all the fluid so directed into the inner flocculation chamber is recycled into the mixing chamber, while most of the fluid in the outer flocculation chamber is channeled into the sedimentation chamber for settlement. At a given influent flow volume, the time required to achieve a desired degree of flocculation can be provided by controlling the percentage of waste water fluid recirculated from the flocculation chambers back into the mixing chamber. Other factors, such as whether chemicals are added to the influent, the pH value of the raw water, its viscosity, temperature and degree of agitation are also considered when regulating the degree of recirculation.

Raw sewage, or crude waste water, is introduced into the bottom of the inlet tower, which is of a larger diameter than the inlet pipe in order to diffuse the incoming liquid to effect energy loss. An auger screw and baffle are provided within the inlet tower to guide and lift the waste water upwardly towards the top of the sedimentation tank in a controlled, slightly agitated manner to encourage flocculation and resist damage to already formed flocculation accumulations by the action of additional, surging influent. Openings are provided annularly in the top of the inlet tower for the discharge of the flocced and semi-flocced accumulations. Adjustable ring type lips are mounted as end sections on top of the intermediate wall dividing the concentrically positioned inner and outer reaction chambers to intercept and deflect the flow out of the top of the inlet tower. A larger portion of the flocculations is directed into the inner reaction chamber, while a smaller portion is directed into the outer chamber. Annular openings at the bottom of the inlet type tower are provided similar to those located at a top. All of the inner reaction chambers' portion of floc containing liquid is directed back into the bottom of the inlet tower together with a small percentage of the outer reaction chambers' portion. The wall dividing the inner and outer reaction chambers is designed to segregate and guide this flow. Another set of adjustable lips or baffles, is mounted on the bottom rim of the dividing wall to direct fluid back into the mixing chamber in the inlet tower through the inlet openings. The liquid recycled into the bottom of the inlet tower, having already passed through the tower before, contains some floc accumulations which, upon being combined with fresh raw waste water influent, encourage more and larger flocculations in the mixing chamber of the inlet tower. Chemicals which may have been originally added in the mixing chamber to induce flocculation are also recycled.

It can be appreciated, therefore, that, after a brief starting period, the portion of liquid directed into the outer reaction chamber will contain a greater percentage of large flocculation accumulations than would be present without the benefit of multiple exposure of small flocculation accumulations with each other in raw influent within the mixing chamber as a result of recirculation.

Since a high percentage of the portion directed into the outer reaction chamber is not recirculated into the mixing chamber in the inlet tower, the relatively large flocculation accumulations contained in this outer reaction chamber portion are not disturbed and broken up. Instead, except for a very small portion redirected into the inlet tower to encourage new flocculation, they are isolated and directed into the sedimentation tank surrounding the outer reaction chamber for settlement.

A feature of this invention is a provision of a compact flocculation zone, within a sedimentation tank, comprised of a plurality of concentrically arranged reaction chambers.

Another feature of this invention is a provision of openings in the bottom of the mixing chamber so that recirculation of semi-flocced liquid and raw influent can be quickly effected between the reaction chambers and inlet tower.

Still another feature of this invention is the provision of adjustable end sections mounted on the top and bottom of the dividing wall between the reaction chambers to provide adjustable control of the portion of effluent from the mixing chamber which enters each reaction chamber and returns to the mixing chamber.

Still another feature of this invention is the provision of mechanism which removes the floating scum and the clarified effluent from near the top of the sedimentation tank simultaneously without mixing one with the other.

Another feature of the invention is the provision of agitation shovels in the sump beneath the inlet tower to thicken the accumulated sediments so that it resists being recirculated up through the mixing chamber.

Another feature of this invention is the utilization of an auger screw within the inlet tower to gently and positively control the mixing and conveyance of the crude water and flocculation accumulations into the reaction chambers.

It is an object of this invention to provide an improved water treatment plant wherein the flocculation accumulations capable of settlement are quickly formed and guided directly into the sedimentation tank.

Another object of this invention is to provide apparatus which does not destroy previously formed large flocculation accumulations so that the efficiency of the flocculation activity is maximized.

Another object of the invention is to provide an agitator wherein the mixing of the incoming sewage with previously formed flocculation accumulations is improved.

Still another object of the invention is to provide a flocculation apparatus wherein the size of the reaction zone for flocculation is minimized.

Other objects, advantages, and features of this invention will become more readily apparent when the description of the preferred embodiment is read and studied in conjunction with the attached figures.

Description of the preferred embodiment

As shown in FIGURE 1, a circular inlet tower 1a, extending vertically upward, is located in the center of circulation sedimentation tank 1. Inlet tower 1a encloses a mixing chamber 2. Mounted concentrically with respect to chamber 2 is an inner reaction or flocculation chamber 3 which in turn is surrounded by a concentric outer reaction or flocculation chamber 4. The boundary between the inner and outer flocculation chambers 3, 4 is defined by an annular intermediate wall 16 also concentric with inlet tower 1a. The sedimentation tank chamber 5 is separated from the flocculation or reaction zone by separation wall 15 which is mounted in a suspended position above the bottom of tank 1 so that scraper blades 17 (described later) can sweep under to push the sediment into a sump 9 located beneath inlet tower 1a which is mounted in a raised position above the bottom of tank 1. This space between the tank bottom and the bottom of the separation wall could be termed a flocculation opening. The top of separation wall 15 extends above the water level in chamber 5 so that there is no fluid communication between the flocculation and sedimentation zones except at the bottom of the tank beneath separation wall 15.

Inlet tower 1a has a series of discharge openings 6 annularly arranged at the top thereof and similar inlet openings 7 annularly arranged at the bottom. A conveyance auger 8 is positioned vertically in inlet tower 1a for rotation therein; it is powered by a drive motor 13 through a stageless adjustable gear reduction 14 so that its speed can be varied to accommodate different influent flow volumes. The drive motor and gear reduction system are designed so that the conveyance auger has the power and speed capacity to convey an influent flow volume requiring three to five times the torque required to convey the normal, design influent flow volume. The motor and gear assembly are mounted above, and are supported by, a platform support cover 61 on the top of inlet tower 1a. A crude water or sewage inlet pipe 10 extends from outside, below sedimentation tank 1, and protrudes into inlet tower 1a to a point just above the top of inlet openings 7 so that crude water is projected axially onto the bottom of conveyance auger 8. To remove sediment which has been scraped from the bottom of sedimentation tank 1 into sump 9, a sludge discharge conduit 11 extends under the floor of tank 1, parallel to inlet 10, and down into sump 9. A shutoff gate 12 is provided on sludge discharge 11 for flow control purposes.

In operation, raw sewage influent (waste water) is introduced upwardly into the mixing chamber 2 through crude water inlet 10. Rotating conveyance auger 8 serves to mix, circulate, agitate and lift the mixture in mixing chamber 2 towards the top of inlet tower 1a in a positive, gentle and controlled manner. Conveyance auger 8 also tends to protect the already formed flocculation accumulations from destruction by particles and solids propelled by any subsequent surges of influent through crude water inlet 10.

The speed of auger screw 8 is coordinated with the volumetric flow of influent through crude water inlet 10 so that it neither impedes the flow of liquid up through mixing chamber 2, nor induces sediment to lift from the bottom of chamber 5 in sump 9 and travel upward and return to the flocculation and mixing process in chamber 2. At the top of mixing chamber 2, the liquid is forced by conveyance auger 8 to discharge radially through discharge openings 6 into flocculation chambers 3 and 4. The outflow through discharge openings 6 is intercepted by the end section lip of adjustment ring 51, which is mounted on the upper portion of intermediate wall 15, and is shaped in the form of an inwardly directed truncated cone. A similar adjustment ring 32 is located on the bottom of the intermediate wall 16. Adjustment rings 51, 52 are axially vertically adjustable and their height with respect to discharge and inlet openings 6, 7, respectively, can be varied by means of threaded rods extending upward and mounted into the same support cover 61 on which drive motor 13 is mounted. This is shown more clearly in FIGURE 6. All of the flow from mixing chamber 2 through discharge openings 6 is directed into either the inner flocculation chamber 3 or the outer flocculation chamber 4. Since the lips forming adjustment rings 51, 52 act as baffles to control and direct this flow, the portion of fluid discharging from mixing chamber 2 into the outer flocculation chamber 4, as a percentage of total volumetric flow, is therefore, readily adjustable. Since the portion which is not directed into outer flocculation chamber 4 is directed into inner flocculation chamber 3, the degree of recirculation from flocculation chamber 3 and 4 back into mixing chamber 2 is primarily controlled by the position of the adjustment ring 51. The lower conical adjustment ring 52 on intermediate wall 16 is inwardly directed and designed to direct substantially all of the inner flocculation chamber portion back into mixing chamber 2. Inlet openings 7 are shaped as vertically extending slots, so the height of lower adjustment ring 52 relative to the bottom of inlet openings 7 also serves to regulate the percentage of the portion of the fluid from the outer flocculation chamber 4 which re-circulates back into mixing chamber 2. Usually a minor percentage sub-portion of the portion entering the outer flocculation chamber 4 is allowed to re-enter mixing chamber 2 to provide large flocculation accumulations to encourage new flocculation activity there. The remaining major percentage sub-portion of the outer flocculation chamber portion is urged into the sedimentation chamber beneath the separation wall for settlement.

As shown in FIGURE 1, inner flocculation chamber 3 tapers inwardly from the center towards the top and bottom to a smaller horizontal cross sectional area. The partially flocced fluid entering inner chamber 3, therefore, has a chance to spread out and slow down to provide more time for the flocculation process before being recirculated into mixing chamber 2. In a similar manner, separation wall 15 is spaced sufficiently far from intermediate wall 16 to allow the fluid to move at a slightly slower speed so that continued flocculation can occur before the accumulations are discharged into sedimentation chamber 5. In either case, the fluid flow is not slowed to the point where the agitation activity of the flocced particles induced by conveyance auger 8 is not adversely affected.

Chemicals to aid the flocculation process may be added into inlet 10 or mixing chamber 2 to speed flocculation there. These chemicals are well known in the industry and function by relieving the electric potential of the particles to facilitate and encourage the agglomeration process. Since all of the liquid directed into inner flocculation chamber 3 is returned to mixing chamber 2 through inlet opening 7, under the guidance of adjustment ring 52, the degree of recirculation necessary for complete flocculation can be regulated in view of the aforementioned parameters of time, water pH value, viscosity and temperature. The portion re-entering mixing chamber 2 from inner flocculation chamber 3 contains partially formed flocculation accumulations which then mix with raw influent and other partially formed flocculation accumulations to form larger flocculation accumulations. The chemicals injected into mixing chamber 2 are also recycled from flocculation chamber 3 so their flocculation properties are efficiently utilized until they are completely depleted.

The flocculation process, therefore, takes place within a relatively small annular zone wherein the flow traces a path from the mixing chamber 2 through discharge openings 6 into inner flocculation chamber 3 and back into mixing chamber 2 through inlet openings 7. A small amount of flocculation activity continues to occur among the large accumulations in outer flocculation chamber 4, but the accumulations in chamber 4 are already capable of settling so activity there, while technically within the flocculation zone, is no longer strictly essential to the flocculation process. After a brief period of this recirculating cycle, the portion which is directed into outer flocculation chamber 4 will contain a high percentage of large, dense flocculation accumulations. These accumulations travel from top to bottom of flocculation chamber 4, as shown by the arrows in FIGURE 1, under the impetus of their weight and the direction of flow of discharge openings 6 so that they enter sedimentation chamber 5 by traveling under separation wall 15. The density of the flocculation accumulations and the direction of flow through outer flocculation chamber 4 cooperate with a low location of the communication channel between outer flocculation zone 4 and sedimentation chamber 5 to encourage quick settling of the accumulations on the floor of sedimentation tank 1.

The top of the outer wall of sedimentation tank 1 defines a rim 21 on which wheels 20 are arranged to support one end of bridge 19 as it rotates about its other end which is rotatably mounted on an axial bearing surface 62 concentric with conveyance auger 8. Bearing surface 62 is in turn supported by support cover 61. Wheels 20 track along the top of rim 21 as bridge 19 is rotated through drive means (not shown) such as an electrical motor geared to rotate wheels 20. By powering bridge 19 through its support wheels 20 on rim 21, no torque load is induced in either inlet tower 1a or separation and intermediate walls 15 and 16, respectively.

Figure 2:
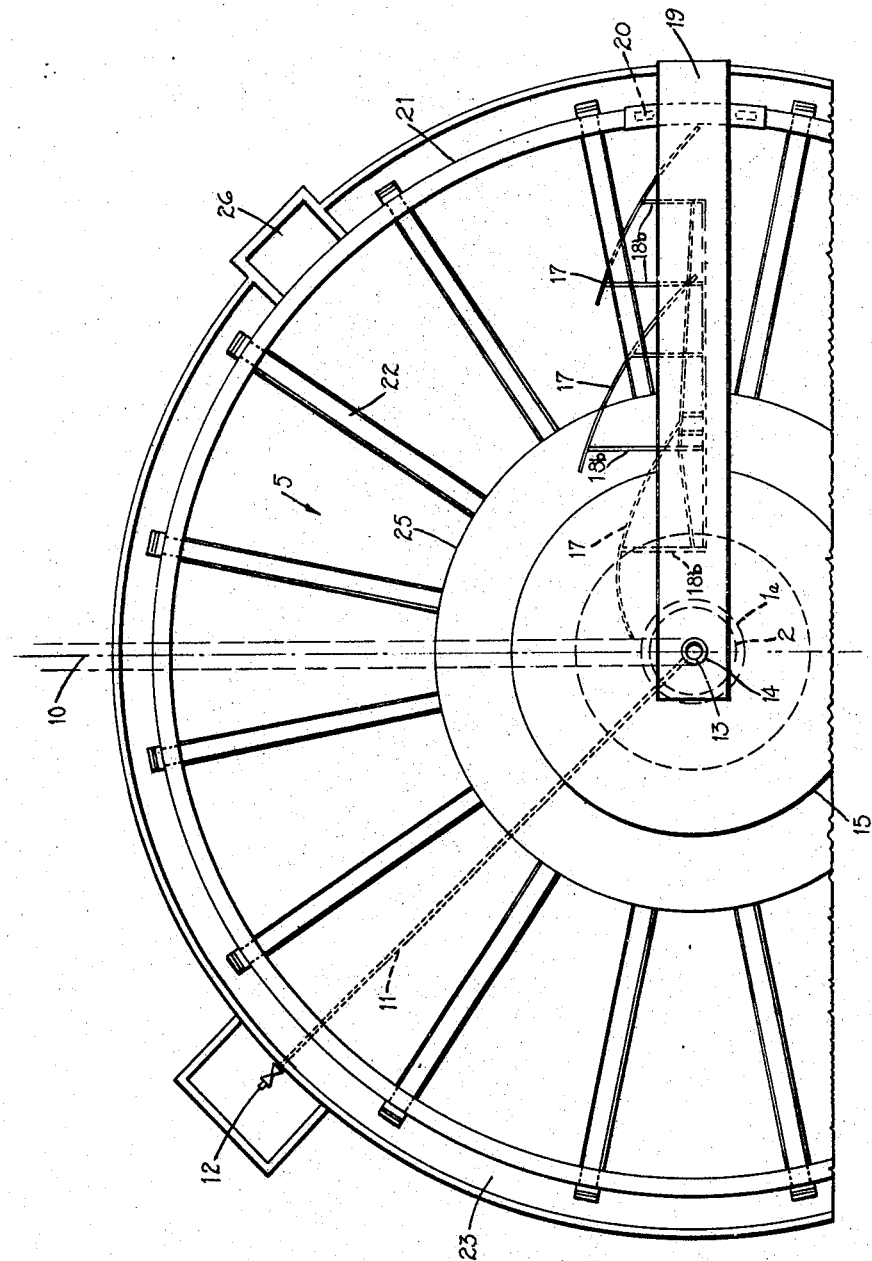

As shown in FIGURES 1 and 2, scraper blades 17 are supported and hung from bridge 19 by means of support rods 18a on which smaller blade rods 18b are attached to guide each scraper blade 17.

Figure 3:
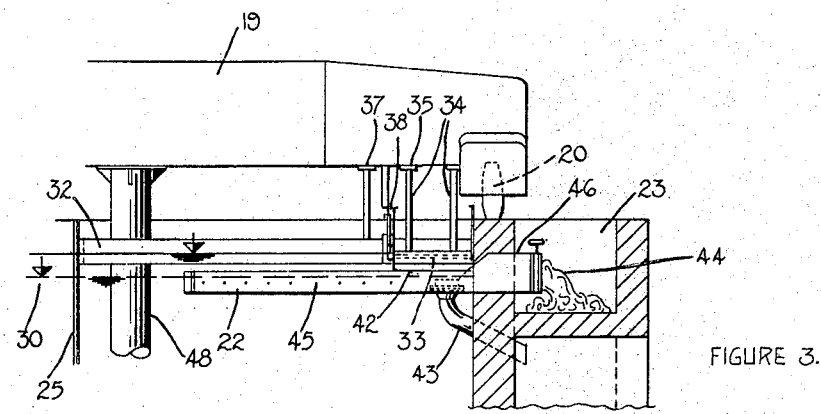

A plurality of discharge chutes 22 is mounted near the top of sedimentation tank 1 horizontally, in spoke like array, in the outer wall pointing inwardly towards inlet tower 1a. Each chute 22 is shaped like a long rectangular box, open at the top, and is positioned so that when clarified effluent is being discharged out of sedimentation chamber 5, its sidewalls extend above the operating water level line 30 as shown in FIGURE 3. The clarified effluent enters each chute 22 beneath the water level line 30 through a line of horizontal effluent openings 45 located in the sidewalls of each chute 22, as shown in FIGURE 3. Since the sidewalls extend above operating water level line 30, scum floating on top of the water is prevented from entering the discharge chutes 22 to mix with clarified effluent.

The inwardly extending sides of discharge chutes 22 are supported by a circular support ring 25. This is a hoop like band which is horizontally positioned outside of separation wall 15 concentric with inlet tower 1a. A more apt definition of support ring 25 might be a tension ring, or cable since its supporting force is derived by linking and maintaining each discharge chute 22 in tension so that, in effect, a continuous span across sedimentation tank 1 is created by each pair of diametrically opposite discharge chutes 22 connected by support ring 25.

Since support ring 25 is spaced from, and has a greater diameter than, the outer separation wall 15, a continuously open ring, unobstructed by support members, is created annularly with respect to the flocculation zone. The main support rod 17a extends from bridge 19 vertically down through this opening so that scraper blades 17 can be supported and driven by the rotation of bridge 19 about rim 21 without interference with discharge chutes 22.

A scum blade 32 is also mounted on bridge 19 for rotation therewith. It extends horizontally from separation wall 15 to within a foot or so of the outer wall of tank 1 at which point it bends rearwardly with respect to the direction of bridge rotation and extends a short distance along a circular arc before ending. The radius of the circular arc is equal to the distance from the axis of bridge rotation to the point where scum gathering blade 32 is bent rearwardly. Since the area swept by scum blade 32 passes over discharge chutes 22, the lowermost extension of scum blade 32 is just above the plane in which the tops of the sides of discharge chutes 22 lie. Scum blade 32, therefore, also is positioned above water level 30.

Figure 4:
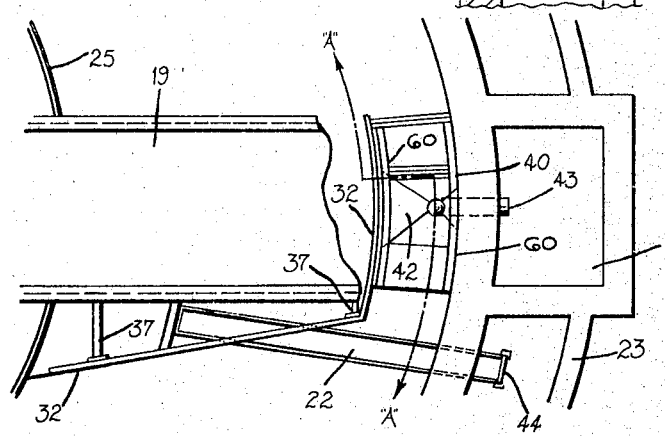
Figure 5:
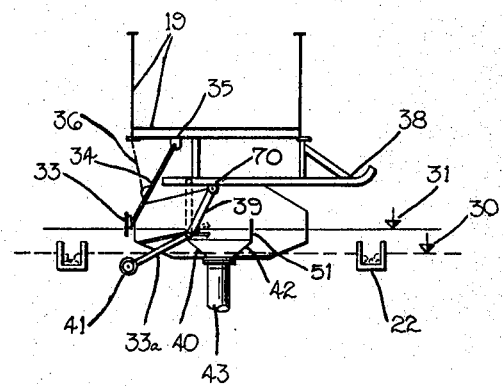

One or more scum collectors 42 is located inside tank 1 between its sidewall and the arc swept by scum blade 32. These are used in cooperation with scum blade 32 to remove floating scum and other debris from the surface of the clarified liquid in sedimentation chamber 5. With reference to FIGURES 3, 4, and 5, the scum collector apparatus 42 comprises two sidewalls 60, a trailing end wall 51 and a leading end wall 40. The end wall 40 is pivoted horizontally on the bottom side thereof to allow scum to be swept in when desired as explained below. The leading and trailing wall designations are determined according to the order in which they are encountered as scum gathering blade 32 sweeps by with rotation of bridge 19.

All of the walls of the scum collector 42 extend above the highest level that liquid in sedimentation chamber 5 is ever expected to reach so that no liquid can be discharged through them out of the tank 1 except when scum removal is desired. A scum collector blade 33 is pivotally mounted on bridge 19, through arms 34, at pivot points 35. This blade is adapted to swing through, and closely fit between, the parallel sidewalls 50 of scum collector 42 as bridge 19 rotates past overhead. A cable 36 links arms 34 with bridge so that the lowermost extension of collector blade 33 can be adjustably controlled. Normally, its lowermost operating position is just above the tops of the sides of discharge chutes 22 so that it, too, will clear them during operation.

When it is desired to remove floating scum debris, a gate plug 44 is lowered into the end of each discharge chute 22 which extends outside tank 1 through its sidewall. The height of the exterior ends of discharge chutes 22 is higher than the sidewalls thereof which extend into sedimentation chamber 5. Gate plug 44, therefore, can be lowered to block the exterior end of discharge chutes 22 to a height equal to, or greater than, the interior sidewalls and still leave room at the top for discharging liquid from sedimentation chamber 5.

At this point, when clarified effluent is being discharged from sedimentation chamber 5 through effluent openings 45 and discharge chutes 22 the position of water level line 30 with respect to the sidewalls of discharge chutes 22 should be reiterated. The tops of the sidewalls of discharge chutes 22 extend above water level line 30 so that scum cannot enter into discharge chutes 22 through their open tops. Discharge openings 45 are located in the sidewalls of discharge chutes 22 below water level line 30 so that floating scum and debris cannot enter discharge chutes 22 through them. The bottom of discharge chutes 22 is located below discharge openings 45 so that the pressure head of water level line 30 forces clarified effluent into discharge chutes 22 for discharge out of sedimentation chamber 5.

When the gate plugs 44 are lowered into position in the end of each discharge chute 22, the water level in sedimentation chamber 5 rises because all sources of discharge are blocked until the water level reaches the tops of gate plugs 44. This scum overflow level is indicated by number 31 in FIGURE 5. At overflow level 31, floating accumulations and scum are brought within the range of scum collector blades 32 and 33 and, as bridge 19 rotates, scum blade 32 collects and guides scumming debris outwardly to the area swept by collector blade 33. Since the water level 31 is above the tops of the sidewalls of discharge chutes 22, floating scum does not enter, but floats above them. Also, with gate plugs 44 in the exterior ends of discharge chutes 22, clarified water is not lost during the scum removal process.

A bent lever arm 39 is fastened to the pivoted leading wall 40 on scum collector 42. One end of arm 39 extends upwardly and a rotor wheel 70 or some other suitable sliding contact device, is mounted thereon to contact a horizontally moving depressor control surface passing beneath the topmost extension of contact device 70 on the arm's end. The lever arm 39 is fastened to wall 40 in such a manner that when wall 40 is positioned vertically, thereby preventing scum from entering scum collector 42, the upwardly extending end of arm 39 is at its highest elevation. On the other, downwardly extending, end of arm 39, a counterweight is attached to maintain wall 40 in the vertical position when the upwardly extending end of arm 39 is not being pressed down. The horizontally moving depressor surface here takes the form of a control rail 38 as shown in FIGURES 3 and 5. Control rail 38 is a long flat rail having an upturned leading edge. It is mounted on the bottom of bridge 19 so that its flat surface is horizontally positioned, with its leading edge pointing in the direction of bridge rotation, directly above the upwardly extendng end of arm 39 so that when the bridge passes over scum collector 42, control rail 38 depresses contact device 70 and pivoted wall 40 is lowered to allow scum to enter scum collector 42.

When all the scum and debris has been swept from the surface of sedimentation chamber 5 at water level 31, gate plugs 44 are removed from the ends of discharge chutes 22 and the water, whose surface is now momentarily free of scum and debris, returns to level 30 whereupon clear effluent continues to be discharged out of tank 1.

When the water level is at 30, the walls of scum collector 42 are high enough to prevent the water from entering even though the top part of its leading wall is deflected with each revolution of bridge 19. Therefore, clarified effluent is not removed through the scum removal apparatus except when the water level is deliberately raised to level 31.

Clear effluent removed through discharge chutes 22 is discharged into collection trough 23 annularly formed around the top of tank 1. Scum is never discharged into collection trough 23, but is discharged through a pipe leading out of the bottom of scum collector 42 through the wall of tank 1 to a remote collection point.

Figure 6:
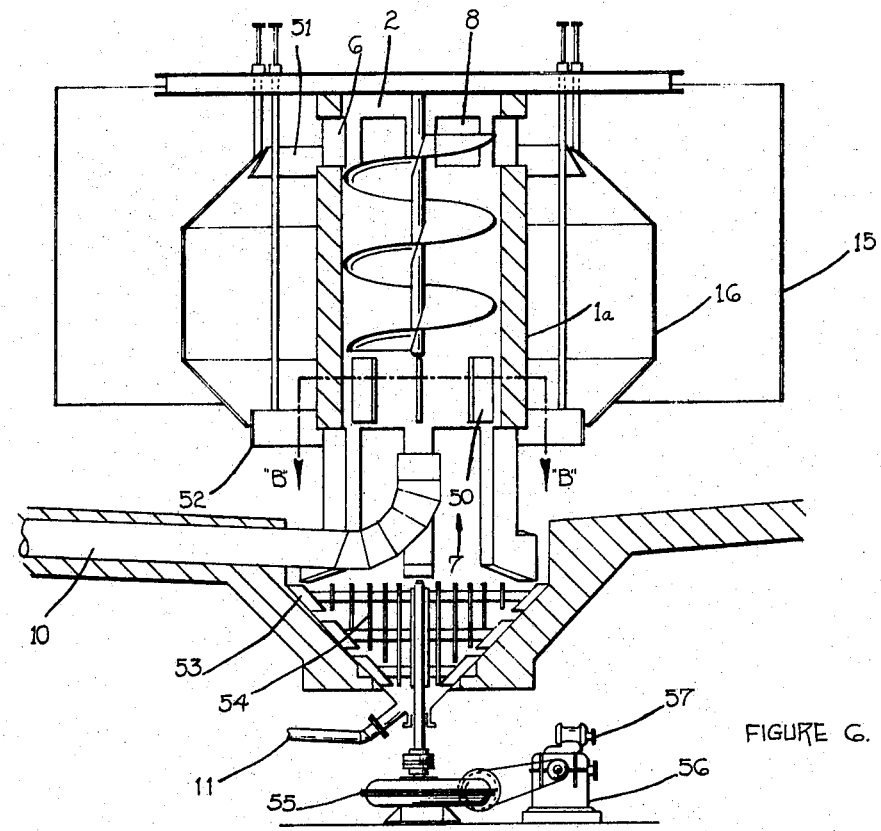

In FIGURE 6, a large view of the mixing chamber 2, flocculation chambers 3, 4 and the sediment thickening apparatus in sump 9 is shown. Agitating blades 53 are mounted on a shaft which extends vertically into sump 9 upwardly through the peak of its inverted cone. These agitating blades are shaped to rotate in close running relationship with the walls of sump 9 to concentrate sediment directed into the sump by scraper blades 17 before it is discharged through sludge discharge 11. By thickening the sediment in sump 9, it is made less susceptible to being drawn up into inlet tower 1a under the influence of conveyance auger 8 and incoming crude water. Agitating blades 53 are driven by a motor 57 which is connected to worm gear drive 55 through reduction gear 56. The output shaft to worm gear 55 is, in turn, connected to the vertical shaft on which agitating blades 53 are mounted.

Figure 7:
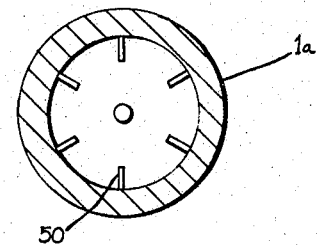

FIGURE 7 is a cross-sectional view of inlet tower 1a taken through section B—B of FIGURE 6. Baffles 50, used to guide and control the upward movement of raw inlet water mixing with recycled fluid from flocculation chambers 3 and 4, are clearly shown with their blades vertically mounted in the lower end of inlet tower 1a. These baffles 50 also function to discourage the liquid returning from flocculation chambers 3 and 4 from merely rotating with conveyance auger 8 instead of re-entering chamber 2 as desired.

Thus it will be seen that an improved flocculation and sedimentation apparatus has been provided which achieves the objects and advantages set forth and avoids the disadvantages associated with prior such systems.

We claim:

1. In an apparatus for flocculating and settling pollutants in waste water including, in combination:
    a sedimentation tank having a bottom and a substantially vertical sidewall extending around the periphery thereof, said sidewall having at its top, a flat, horizontal circular rim;
    a sump means located in the bottom;
    an inlet tower mounted on the bottom, said inlet tower being hollow with top and bottom ends enclosing a mixing chamber means therein, and having a plurality of discharge and inlet openings annularly arranged near the top and bottom ends, respectively;
    a waste water inlet conduit extending from outside the tank upwardly into the bottom of the inlet tower to discharge waste water fluid into the mixing chamber to travel upwardly therein and out of the discharge openings;
    a sludge discharge conduit extending from the sump means to outside the tank;
    a continuous separation wall, having top and bottom ends, mounted within the tank extending around and spaced from the inlet tower, the bottom end of said separation wall mounted near but spaced from the bottom and the top end extending upwardly to near the top of the rim thereby defining a flocculation zone and sedimentation chamber within and outside its periphery, respectively, so that communication between said flocculation zone and said sedimentation chamber is permitted only beneath the separation wall;
    a continuous intermediate wall means concentrically mounted about the inlet tower, within the separation wall, thereby defining inner and outer flocculation chambers within and outside its periphery, respectively, said intermediate wall means having open top and bottom end sections positioned near the discharge and inlet openings, respectively, to intercept and divide the fluid from the discharge openings into first and second portions which enter the inner and outer flocculation chambers, respectively, whereby the bottom end section directs the first portion and a minor percentage of the second portion back into the mixing chamber to effect recirculation of all fluid except a major percentage of the second portion which is discharged beneath the separation wall into the sedimentation chamber for settlement therein;
    a clarified effluent collection means mounted in the sedimentation chamber to collect and discharge effluent outside the tank;
    a bridge positioned above the tank and mounted for rotation about the rim thereof;
    drive means operatively connected to the bridge to rotate it about the rim;
    scraper means positioned on the floor of the tank to collect settled sediment and guide it towards the sump for discharge, said scraper means being supported by the bridge and driven by the rotation thereof;
    scum collection means in the sedimentation chamber located near the surface thereof to collect floating scum and discharge it from the tank.

2. Apparatus as set forth in claim 1, further including:
    a conveyance means mounted within the mixing chamber to gently mix and lift the waste water fluid upwardly and out of the discharge openings.

3. Apparatus as set forth in claim 2, wherein:
    said conveyance means comprises an auger screw extending vertically from near the inlet openings to near the discharge openings, said auger screw having a diameter slightly less than the diameter of the mixing chamber, and having drive means operably connected to the auger screw to rotate it.

4. Apparatus as set forth in claim 1, wherein:
    said top and bottom end sections are adjustable with respect to the discharge and inlet openings whereby said first and second portions can be varied to control the degree of mixing and recirculation of waste water fluid through the mixing and flocculation chambers.

5. Apparatus as set forth in claim 4, wherein:
    said top and bottom end sections are in the shape of hollow truncated cones having the small ends tapering toward the discharge and inlet openings to facilitate guiding the waste water fluid from and into the discharge and inlet openings, respectively.

6. Apparatus as set forth in claim 1, further including:
    baffle means mounted on the inlet tower near the inlet openings to facilitate entry of recycled portions of waste water fluid into the mixing chamber, and to resist any tendency of the recycled portions to rotate with the conveyance means instead of re-entering the mixing chamber.

7. Apparatus as set forth in claim 1, wherein:
    said sump means comprises a conical pit sloping inwardly downwardly and includes a sediment concentrating means to thicken the collected sediment to resist being drawn back into the flocculation and sedimentation chambers.

8. Apparatus as set forth in claim 7, wherein said sediment concentration means comprises:
    a set of scraper blades mounted on a vertical sump shaft extending upwardly within the sump, and sump drive means operably connected to said sump shaft to rotate it within the sump.

9. Apparatus as set forth in claim 1, wherein:
    said drive means comprises a powered wheeled carriage supporting the bridge on the rim for rotation thereabout, thereby substantially alleviating torsional stress induced by the drive means in the inlet tower, intermediate and separation walls.

10. Apparatus as set forth in claim 1,
    wherein operating and overflow water level lines are defined within the sedimentation chamber, said overflow water level line being higher than the operating water level line, and said clarified effluent collection means comprises:
    a plurality of open-top rectangular discharge chutes horizontally mounted in the sedimentation chamber, each chute having a bottom, two side walls and inner and outer ends terminated with end walls, said outer ends mounted in and extending through the tank side wall with the inner ends extended radially inwardly toward the inlet tower, said side walls extending above and below the operating water level line with effluent openings horizontally positioned along the length thereof below the operating water level line so that clarified effluent can enter the discharge chutes to be removed from the tank while scum floating at the operating water level line is prevented from entering the discharge chutes;
    a support ring connected to the inner end of each discharge chute to link all chutes together and support them within the sedimentation chamber.

11. In an apparatus for flocculating pollutants in waste water comprising in combination:

a tank having a bottom and a side wall extending around the periphery thereof, said side wall having flocculation openings therein;

a hollow inlet tower mounted in said tank extending upwardly from the bottom thereof, said inlet tower enclosing mixing chamber means within, and having top and bottom ends having discharge and inlet openings, respectively;

inlet conduit means for introducing waste water fluid into the bottom of said mixing chamber to travel upwardly therein and out of the discharge openings;

at least one continuous intermediate wall means mounted concentrically about the inlet tower within and spaced from the side wall, said intermediate wall defining inner and outer flocculation chambers within and outside its periphery, respectively, and having open top and bottom end sections positioned near the discharge and inlet openings, respectively, to intercept the fluid leaving the discharge openings and apportion it between the inner and outer flocculation chambers, wherein the bottom end section directs substantially all of the inner flocculation chamber portion back into the mixing chamber via the inlet openings, and the outer flocculation chamber portion is discharged from the tank via the flocculation openings for settlement.

12. Apparatus as set forth in claim 11, wherein:

said outer flocculation portion is divided into major and minor sub-portions, said minor sub-portion is recirculated back into the mixing chamber to promote new and additional flocculation, and the major sub-portion is discharged from the tank via the flocculation openings for settlement.

13. Apparatus as set forth in claim 12, further including:

a powered conveyor means mounted within the mixing chamber to gently mix, flocculate and urge waste water fluid out of the discharge openings.

14. Apparatus as set forth in claim 13, wherein:

said conveyance means comprises an auger screw having driving means connected thereto to rotate it within the mixing chamber.

15. Apparatus as set forth in claim 12, wherein:

said intermediate wall means includes top adjustable end section means mounted on the top of the intermediate wall to intercept the fluid from the discharge openings and adjustably apportion it between the inner and outer flocculation chambers, and bottom adjustable ends section means mounted on the bottom of the intermediate wall to direct substantially all of the inner flocculation chamber portion and a minor percentage of the outer flocculation chamber portion back into the mixing chamber via the inlet openings whereby the major portion of the outer flocculation chamber portion is discharged from the flocculation zone via the flocculation openings for settlement.

16. A method for flocculating and settling pollutants in waste water liquid to obtain clarified effluent comprising the steps:

(a) gently mixing a continuous supply of waste water to initiate and encourage flocculation of the pollutants into agglomerated accumulations;

(b) continuously dividing the mixed supply of waste water into at least first and second separate portions;

(c) maintaining each portion in a gently mixing condition to encourage continued flocculation into floatable and sinkable accumulations therein;

(d) continuously recirculating substantially all of the first portion back into the incoming supply of waste water to promote new and additional flocculation;

(e) dividing the second portion into major and minor sub-portions, continuously recirculating said minor sub-portion back into the incoming supply of waste water to promote new and additional flocculation, and continuously removing the major sub-portion to a quiescent environment to allow floatable accumulations to rise to the top of the liquid and heavy accumulations to settle out of the liquid;

(f) separating the floatable and sinkable accumulations from the liquid to obtain clarified effluent.

References Cited

UNITED STATES PATENTS

| | | | |
|---|---|---|---|
| 313,070 | 3/1885 | Gent | 210—197 X |
| 1,902,078 | 3/1933 | Jenks | 210—197 X |
| 2,647,869 | 8/1953 | Kelly | 210—221 X |
| 2,669,357 | 2/1954 | Kivell et al. | 210—197 |
| 2,678,916 | 5/1954 | Kalinske | 210—221 X |
| 3,152,982 | 10/1964 | Pagnotti | 210—197 X |
| 3,300,047 | 1/1967 | Hirsch | 210—208 X |

TIM R. MILES, Primary Examiner

U.S. Cl. X.R.

210—197, 208, 525, 537